(12) United States Patent
Noro et al.

(10) Patent No.: US 12,261,523 B2
(45) Date of Patent: Mar. 25, 2025

(54) SWITCHING POWER SUPPLY (71) Applicant: Yamaha Corporation, Hamamatsu (JP)

(72) Inventors: Masao Noro, Hamamatsu (JP); Yoshiro Miyake, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 212 days.

(21) Appl. No.: 18/116,021

(22) Filed: Mar. 1, 2023

(65) Prior Publication Data
US 2023/0208311 A1 Jun. 29, 2023

Related U.S. Application Data (63) Continuation of application No. PCT/JP2021/031760, filed on Aug. 30, 2021.

(30) Foreign Application Priority Data

Sep. 2, 2020 (JP) ................. 2020-147424

(51) Int. Cl.
*H02M 1/42* (2007.01)
*H02M 1/00* (2007.01)
*H02M 3/335* (2006.01)

(52) U.S. Cl.
CPC ....... *H02M 1/4258* (2013.01); *H02M 1/0025* (2021.05); *H02M 1/0022* (2021.05); *H02M 3/33507* (2013.01); *H02M 3/33569* (2013.01)

(58) Field of Classification Search
CPC ................. H02M 1/42; H02M 1/4208; H02M 1/4225–4258; H02M 1/0022;
(Continued)

(56) References Cited

U.S. PATENT DOCUMENTS 5,689,176 A * 11/1997 Deloy ................. H02M 1/4225
323/288
5,804,950 A * 9/1998 Hwang ............... H02M 1/4225
323/222

(Continued)

FOREIGN PATENT DOCUMENTS

JP 5-300734 A 11/1993
JP 6-22546 A 1/1994
(Continued)

OTHER PUBLICATIONS

Qi, T. et al., "Single-phase PFC control using PWM-based multipliers," 2009 IEEE 6th International Power Electronics and Motion Control Conference, Wuhan, China, 2009, pp. 660-665, doi: 10.1109/IPEMC.2009.5157467. (Year: 2009).*

(Continued)

*Primary Examiner* — Fred E Finch, III
(74) *Attorney, Agent, or Firm* — Crowell & Moring LLP (57) ABSTRACT

In a switching power supply, a rectifying circuit outputs a first voltage. A switching circuit switches the first voltage into a switching voltage. An output circuit generates a second voltage based on the switching voltage. A feedback circuit generates the feedback signal based on the first and second voltages, and includes a carrier wave generation circuit that generates a carrier wave. The carrier wave has a non-linear shape at its rising edge and/or falling edge. A PWM circuit generates a PWM signal based on a comparison between the first voltage and a voltage of the carrier wave. Due to the non-linear shape, as the first voltage is higher, a pulse width of the PWM signal is changeable more greatly based on a change in the first voltage. A low-pass filter generates the feedback signal based on the PWM signal.

20 Claims, 6 Drawing Sheets

(58) Field of Classification Search
CPC ............... H02M 1/0025; H02M 3/335; H02M 3/33507; H02M 3/33569; H02M 3/33571
See application file for complete search history.

(56) References Cited

U.S. PATENT DOCUMENTS

| | | | | |
|---|---|---|---|---|
| 5,867,379 | A | * | 2/1999 | Maksimovic ....... H02M 1/4225 323/222 |
| 2010/0118571 | A1 | * | 5/2010 | Saint-Pierre ........ H02M 1/4225 363/89 |
| 2012/0306394 | A1 | | 12/2012 | Ikeda |

FOREIGN PATENT DOCUMENTS

| JP | 2010-124567 A | 6/2010 |
|---|---|---|
| JP | 2012-191775 A | 10/2012 |
| JP | 2012-253957 A | 12/2012 |
| JP | 2020-137322 A | 8/2020 |

OTHER PUBLICATIONS

International Search Report (PCT/ISA/210) issued in PCT Application No. PCT/JP2021/031760 dated Nov. 2, 2021 with English translation (five (5) pages).

Japanese-language Written Opinion (PCT/ISA/237) issued in PCT Application No. PCT/JP2021/031760 dated Nov. 2, 2021 (three (3) pages).

International Preliminary Report on Patentability (PCT/IB/338 & PCT/IB/373) issued in PCT Application No. PCT/JP2021/031760 dated Mar. 16, 2023, including English translation of document C2 (Japanese-language Written Opinion (PCT/ISA/237) filed on Mar. 1, 2023) (eight (8) pages).

* cited by examiner

SWITCHING POWER SUPPLY

CROSS-REFERENCE TO RELATED APPLICATIONS

The present application is a continuation application of International Application No. PCT/JP2021/031760, filed Aug. 30, 2021, which claims priority to Japanese Patent Application No. 2020-147424, filed Sep. 2, 2020. The contents of these applications are incorporated herein by reference in their entirety.

BACKGROUND

Field

The present disclosure relates to a switching power supply.

Background Art

JP 2012-253957 A discloses a switching power supply used for electronic devices and any other devices. The switching power supply switches an AC commercial power source at a higher frequency and outputting the power source via a transformer to generate an isolated DC power source. The switching power supply switches the AC power source by rectifying and smoothening the AC power source to generate a DC. If a pulsed current flows in the rectification and smoothening, power factor of the switching power supply declines as a result. In order to improve the power factor by controlling a waveform of the current, the switching power supply is normally provided with a PFC (Power Factor Correction) circuit.

Switching power supplies provided with the PFC circuit tend to be large in size.

SUMMARY

One aspect is a switching power supply that includes a rectifying circuit, a switching circuit, an output circuit, and a feedback circuit. The rectifying circuit is configured to rectify an AC voltage that has been input and is configured to output the rectified voltage as a first voltage. The switching circuit is configured to switch the first voltage based on a feedback signal into a switching voltage. The output circuit is configured to generate a second voltage based on the switching voltage. The feedback circuit is configured to generate the feedback signal based on the first voltage and the second voltage. The feedback circuit includes a carrier wave generation circuit, a PWM circuit, and a low-pass filter. The carrier wave generation circuit is configured to generate a carrier wave having a predetermined period and a wave height variable based on an average of the first voltage. The carrier wave has a non-linear shape at least at one of a rising edge and a falling edge of the carrier wave. The PWM circuit is configured to generate a PWM signal based on a comparison between the first voltage and a voltage of the carrier wave. The PWM signal has a wave height corresponding to the second voltage. Due to the non-linear shape of the carrier wave, as the first voltage is higher, a pulse width of the PWM signal is changeable more greatly based on a change in the first voltage. The low-pass filter is configured to generate the feedback signal based on the PWM signal.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures, in which.

DETAILED DESCRIPTION

The present development is applicable to a switching power supply.

An embodiment of the present disclosure will be described below by referring to the accompanying drawings.

Figure 1:
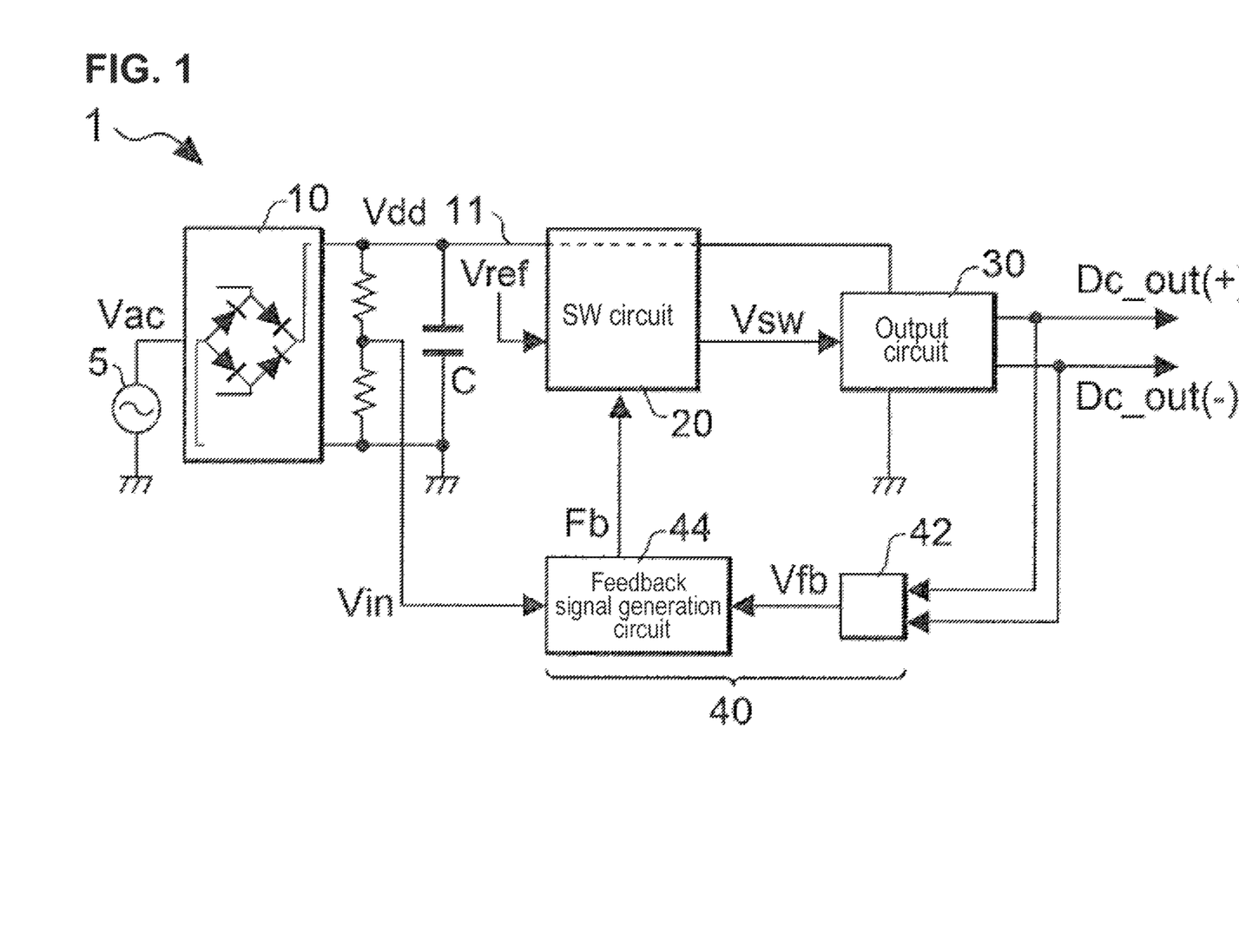
FIG. 1 is a diagram illustrating an exemplary switching power supply.

FIG. 1 is a diagram illustrating a configuration of a switching power supply 1 according to the embodiment. The switching power supply 1 is a power converter for converting a commercial AC power source to a DC power source, for example, and includes a rectifying circuit 10, a switching (SW) circuit 20, an output circuit 30, and a feedback circuit 40.

The rectifying circuit 10 is a diode bridge, for example, full-wave rectifies an AC Vac output from the commercial AC power source 5, and outputs the full-wave rectified voltage Vdd to a feeder line 11. The voltage Vdd is divided by resistive division or other means and fed as a signal Vin to the feedback circuit 40. A capacitor C for smoothening is connected in parallel to output terminals of the rectifying circuit 10.

The SW circuit 20 generates a switching voltage Vsw based on a reference signal Vref, and a feedback signal Fb output from the feedback circuit 40.

The output circuit 30 outputs a positive-side voltage Dc_out(+) and a negative-side voltage Dc_out(−) based on the switching voltage Vsw. While the switching power supply 1 outputs the positive-side voltage Dc_out(+) and the negative-side voltage Dc_out(−) in the embodiment, the switching power supply 1 may be configured to output only one of the voltages.

The feedback circuit 40 includes a separator 42 and a feedback signal generation circuit 44. For example, the separator 42 outputs a voltage difference between the voltage Dc_out(+) and the voltage Dc_out(−) as a signal Vfb via a photocoupler. The signal Vfb is output via the photocoupler so that the input-side AC Vac is insulated from the output-side voltages Dc_out(+) and Dc_out(−). The larger the voltage difference between the voltages Dc_out(+) and Dc_out(−), the lower a voltage of the signal Vfb and the signal Vfb is, in other words, a negative-polarity output voltage of the switching power supply 1. The signal Vfb is a DC voltage that is based on the voltages Dc_out(+) and Dc_out(−). As illustrated in FIG. 1, the feedback signal generation circuit 44 is a circuit for outputting the feedback signal Fb to the switching circuit 20 based on the signal Vin input from the rectifying circuit 10 and the signal Vfb output from the separator 42.

Figure 2:
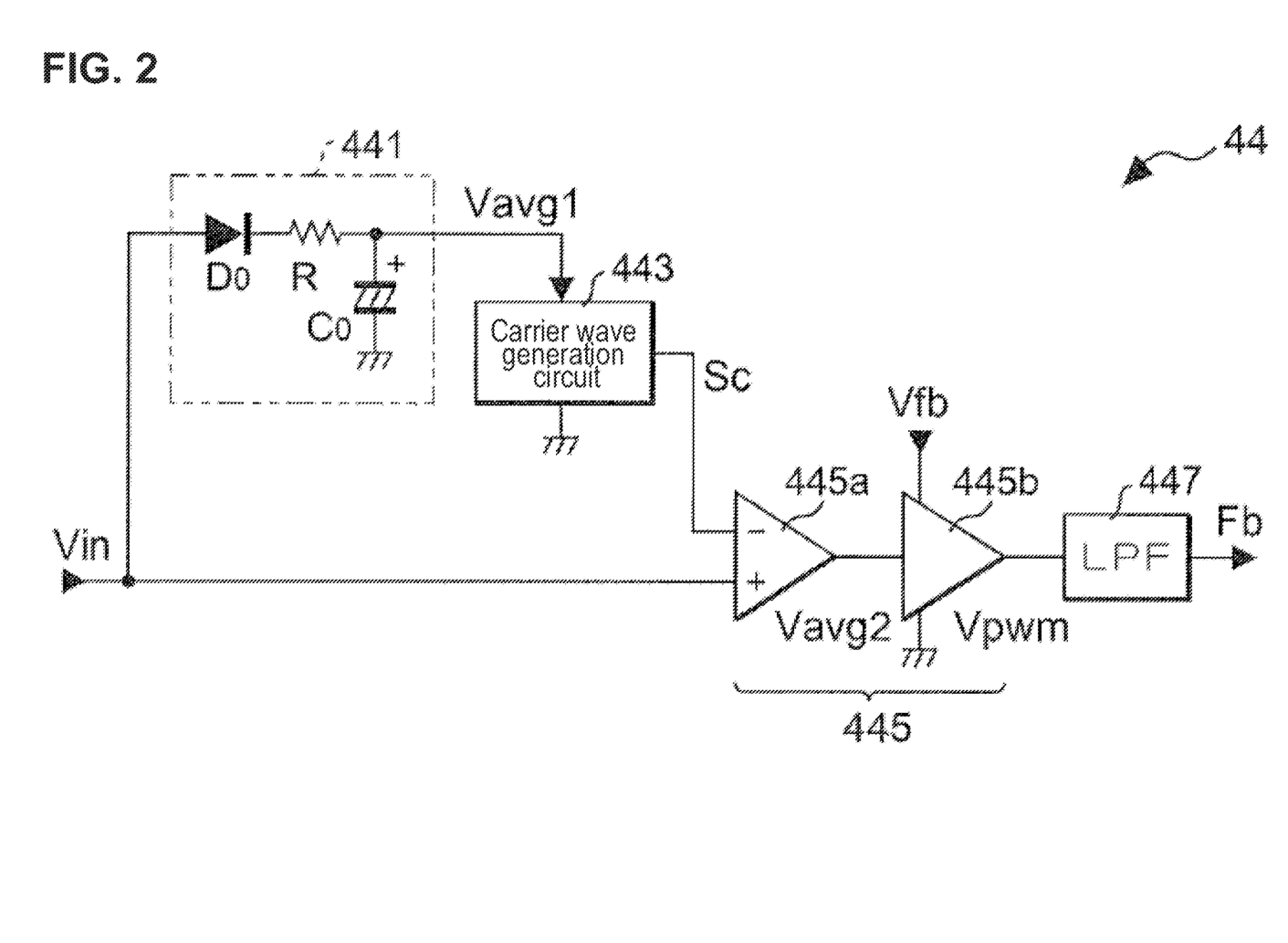
FIG. 2 is a diagram illustrating an exemplary configuration of a feedback signal generation circuit in the switching power supply.

FIG. 2 is a diagram illustrating an exemplary configuration of the feedback signal generation circuit 44. The feedback signal generation circuit 44 includes an averaging circuit 441, a carrier wave generation circuit 443, a PWM circuit 445, and a low-pass filter 447.

The averaging circuit 441 includes a diode D0, a resistance element R, and a capacitor C0, for example, and smooths, with the capacitor C0, the signal Vin in which ripple remains. In other words, the averaging circuit 441 outputs an average voltage value of the signal Vin. Here, a signal output from the averaging circuit 441 is referred to as Vavg1. To be specific, the averaging circuit 441 outputs, based on the signal Vin input from the rectifying circuit 10, the signal Vavg1, which is the average of the signal Vin, to the carrier wave generation circuit 443. The average of the voltage is a value obtained by dividing an integral of the voltage per unit time by the unit time and, in the circuit, corresponds to a voltage at each end of the capacitor C0.

Figure 3:
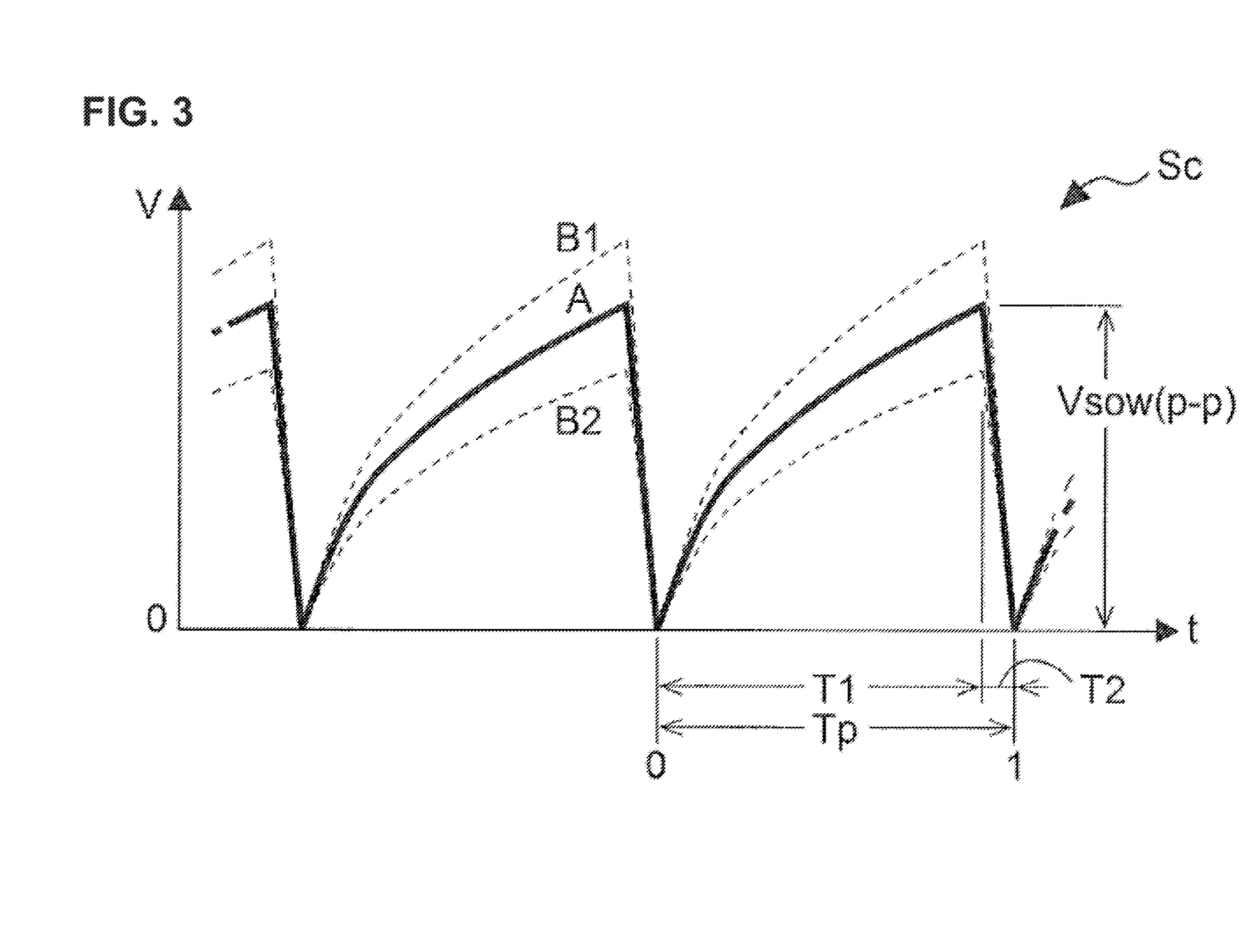
FIG. 3 is a diagram illustrating an exemplary waveform of a carrier wave.

The carrier wave generation circuit 443 outputs a carrier wave Sc. As illustrated in FIG. 3, for example, the carrier wave Sc has a waveform of a triangle wave in which a voltage rising part T1 and a voltage dropping part T2 appearing in one period Tp are repeated. The voltage rises non-linearly (not straight) with time in the part T1 and the voltage drops linearly (straight) with time in the part T2.

In the embodiment, a characteristic of the part T1 is expressed by the following function F.

$$V=F(t^{(1/2)}) \quad (1)$$

In other words, the voltage Vin the part T1 is expressed by the function of the ½ power of time t, which is a square root of time t.

If time t in the function F is normalized by defining a starting point of the one period Tp of the carrier wave Sc as 0 and an end point of the one period Tp as 1, the non-linear part T1 has a shape that is based on the function $F(t^{(1/2)})$ in a part of a domain of 0≤t≤1.

The carrier wave generation circuit 443 makes a wave height Vsow (p-p) of the carrier wave Sc proportional to the voltage of the signal Vavg1. As a result, if the carrier wave Sc is output as shown by a solid line A at a certain voltage value of the signal Vavg1, the carrier wave Sc is output as shown by a broken line B1 when the voltage of the signal Vavg1 is higher while the carrier wave Sc is output as shown by a broken line B2 when the voltage of the signal Vavg1 is lower.

A frequency (1/Tp) of the carrier wave Sc is about tens of kilohertz to hundreds of kilohertz, which is higher than a frequency of the AC power source 5. The wave height is expressed as a peak-to-peak value.

The carrier wave generation circuit 443 is achieved by storing a basic waveform of the carrier wave Sc in memory, repeatedly retrieving the waveform from the memory, and outputting the waveform while making the wave height Vsow (p-p) proportional to the voltage of the signal Vavg1, for example. The carrier wave generation circuit 443 is, in other words, a circuit that outputs the carrier wave Sc having the wave height proportional to the average of the signal Vin from the rectifying circuit 10.

The PWM circuit 445 includes a comparator 445a and a buffer 445b.

To a positive input terminal (+) of the comparator 445a, the signal Vin is fed. To a negative input terminal (−) of the comparator 445a, the carrier wave Sc is fed. Therefore, the comparator 445a compares the voltage of the signal Vin and a voltage of the carrier wave Sc and outputs, as a result of the comparison, a signal Vavg2 having a substantially constant wave height. More specifically, the comparator 445a outputs the signal Vavg2 at an H level if the voltage of the signal Vin is equal to or higher than the voltage of the carrier wave Sc. The comparator 445a outputs the signal Vavg2 at an L level if the voltage of the signal Vin is lower than the voltage of the carrier wave Sc. The signal Vavg2 is a signal with a modulated pulse width. The buffer 445b is a level shifter and outputs a signal Vpwm obtained by shifting the wave height of the Vavg2 based on the signal Vfb while maintaining a pulse shape of the signal Vavg2. In other words, the PWM circuit 445 is a circuit for changing a wave height of the signal Vpwm based on the input signal Vfb. The signal Vpwm is a signal obtained by shifting the level of the signal Vavg2 and therefore is a signal with a modulated pulse width similarly to the signal Vavg2.

The low-pass filter 447 demodulates the signal Vpwm with the modulated pulse width into an analog-voltage feedback signal Fb.

Figure 4:
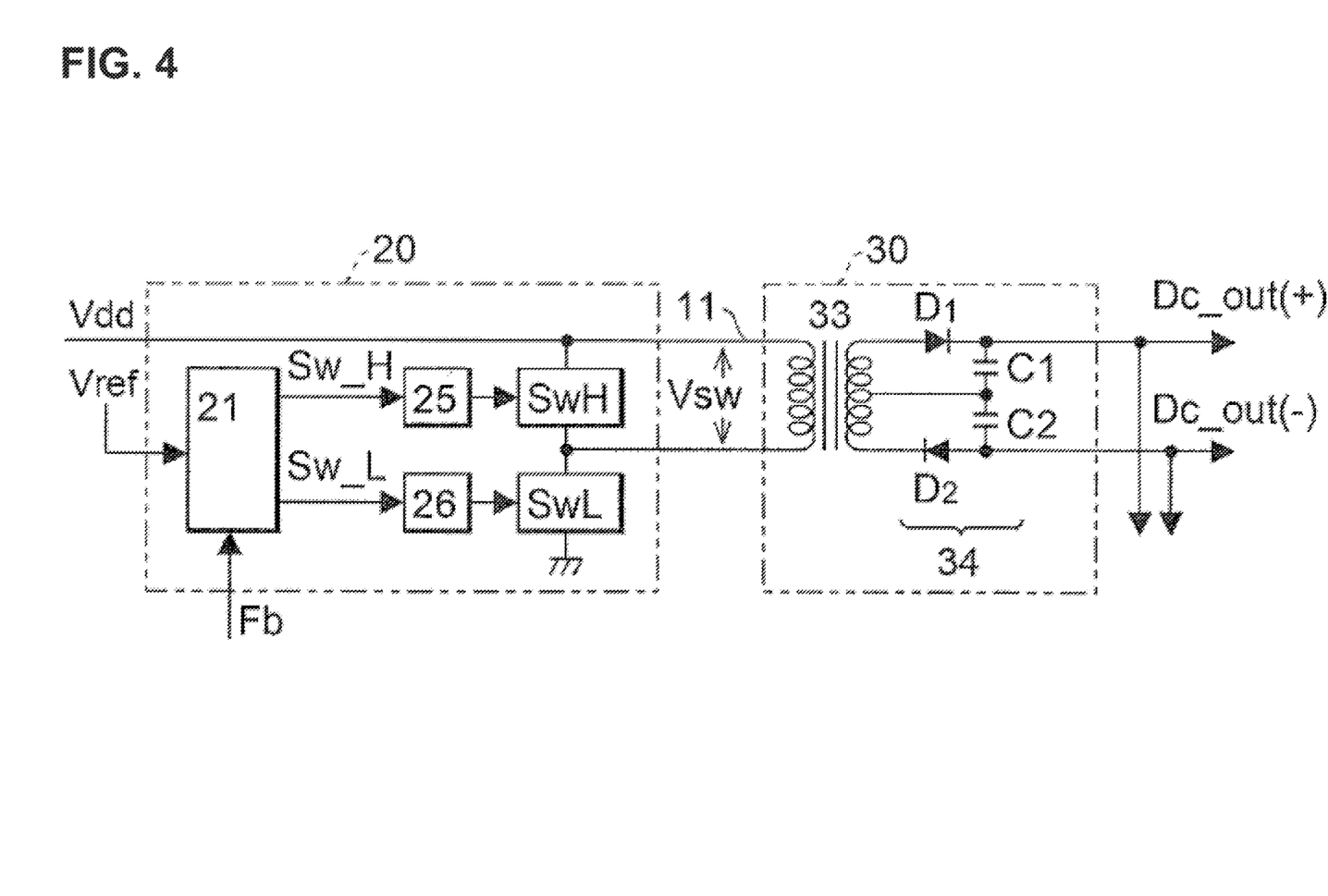
FIG. 4 is a diagram illustrating exemplary configurations of circuits including an SW circuit in the switching power supply.

FIG. 4 is a diagram illustrating exemplary configurations of the SW circuit 20 and the output circuit 30. The SW circuit 20 includes a control circuit 21, drivers 25, 26, and switches SwH, SwL, and the output circuit 30 includes a transformer 33 and a rectifying-smoothening circuit 34.

The control circuit 21 outputs signals Sw_H and Sw_L based on the reference signal Vref and the feedback signal Fb.

The driver 25 amplifies the signal Sw_H and outputs the signal Sw_H as a control signal of the switch SwH. The driver 26 amplifies the signal Sw_L and outputs the signal Sw_L as a control signal of the switch SwL. The feeder line 11 to which the voltage Vdd is output is connected to one end of the switch SwH in the SW circuit 20 and one end of a primary side of the transformer 33. The other end of the switch SwH is connected to the other end of the primary side of the transformer 33 and one end of the switch SwL.

The one end and the other end of the switch SwH are electrically connected to each other when the output signal from the driver 25 is at an H level and are insulated from each other when the output signal is at an L level. In a similar way, the one end and the other end of the switch SwL are electrically connected to each other when the output signal from the driver 26 is at an H level and are insulated from each other when the output signal is at an L level.

The rectifying-smoothening circuit 34 is provided on a secondary side of the transformer 33. More specifically, the rectifying-smoothening circuit 34 includes diodes D1, D2 and capacitors C1, C2. One end of the secondary side of the transformer 33 is connected to an anode of the diode D1 and a cathode of the diode D1 is connected to an output terminal of the voltage Dc_out(+) and one end of the capacitor C1. The other end of the secondary side of the transformer 33 is connected to a cathode of the diode D2 and an anode of the diode D2 is connected to an output terminal of the voltage Dc_out(−) and one end of the capacitor C2. A neutral point of the secondary side of the transformer 33 is connected to the other end of the capacitor C1 and the other end of the capacitor C2 and is grounded while insulated from the primary side.

The control circuit 21 in the SW circuit 20 controls a duty ratio of the signal Sw_H and a duty ratio of the signal Sw_L such that a difference between a voltage of the reference signal Vref and the voltage of the feedback signal Fb output from the feedback circuit 40 becomes small. The control circuit 21 controls the duty ratios of the signal Sw_H and the signal Sw_L such that the higher the voltage of the feedback signal Fb, the larger a duty ratio of the voltage Vsw applied on the primary side of the transformer 33 becomes. Since the signal Vfb has the negative polarity as described above, the higher the output voltage, the smaller the duty ratio of the voltage Vsw becomes. The lower the output voltage, the larger the duty ratio of the voltage Vsw becomes. This operation brings the output voltage closer to a predetermined target voltage.

In a normal switching power supply, and specifically in a configuration in which a voltage of an output signal is directly fed back to a SW circuit 20, reduction of a power factor is caused by devices for rectifying and smoothening an AC voltage. To put it concretely, the devices correspond to the rectifying circuit 10 and the capacitor C in FIG. 1. Since the switching power supply converts the AC into a DC voltage by rectifying and smoothening the AC and stabilizes the output voltage by switching the DC voltage with the switching circuit, the rectifying circuit 10 and the capacitor C are indispensable.

Therefore, in the switching power supply 1 according to the embodiment, the feedback circuit 40 generates the feedback signal Fb to the SW circuit 20 by way of the following computation.

First, a signal (Vin$^2$), which is the square of the voltage of the signal Vin obtained by rectifying and smoothening the AC Vac, is generated.

Second, in order to absorb voltage variation in the AC Vac (signal Vin), a signal (Vin$^2$/Vin average) obtained by dividing a voltage of the signal (Vin$^2$) by the average of the voltage of the signal Vin is generated.

Third, a signal {Vfb×(Vin$^2$/Vin average)} resulting from multiplication of the signal Vfb representing the output voltage by the signal (Vin$^2$/Vin average) is obtained and fed as the feedback signal Fb to the SW circuit 20. Thus, the feedback signal Fb generated by the feedback circuit 40 has a product voltage corresponding to a product {Vfb×(Vin$^2$/Vin average)} of the voltage difference Vfb and a quotient voltage (Vin$^2$/Vin average). The quotient voltage corresponds to a quotient of a square of the first voltage Vin$^2$ by the average of the first voltage (Vin average).

As described above, the computation by the feedback circuit 40 includes the multiplication and division. The multiplication and division are performed as follows in the embodiment.

The signal with the modulated pulse width is a binary signal obtained by comparing the voltage of the input signal Vin and the voltage of the carrier wave. A gain G of the pulse width modulation is expressed by the following equation (1).

$$G = V\text{out}/V\text{in} \quad (1)$$

In the equation (1), Vout is an analog voltage obtained by demodulating, with the low-pass filter, the signal having the modulated pulse width.

The gain G is also expressed by the following equation (2).

$$G = V\text{pwm}(p\text{-}p)/V\text{sow}(p\text{-}p) \quad (2)$$

In the equation (2), Vpwm(p-p) is the wave height of a voltage of the pulse-modulated signal and Vsow(p-p) is the wave height of the voltage of the carrier wave as described above.

In other words, by varying the wave height Vpwm(p-p) of the voltage of the pulse-modulated signal and/or the wave height Vsow(p-p) of the voltage of the carrier wave, the gain G of the pulse width modulation is varied.

As can be seen from the equation (2), the gain G is proportional to the wave height Vpwm(p-p) and inversely proportional to the wave height Vsow(p-p). Therefore, a variation in the wave height Vpwm(p-p) corresponds to multiplication and a variation in the wave height Vsow(p-p) corresponds to division.

In the pulse width modulation, it is necessary to make each of ramps of the carrier wave straight in order to achieve a linear characteristic of conversion of the input signal into the output signal (i.e., the demodulated signal obtained by removing, with the low-pass filter, a carrier component from the signal with the modulated pulse width).

Conversely, if each of the ramps is not straight but curved based on the function F(t) variable depending on time t, the conversion characteristic in the pulse width modulation is based on a characteristic of F$^{-1}$(t), which is an inverse function of the function F(t).

Therefore, to output a signal, which is the square of the voltage of the input signal, the ramp needs to be in a shape expressed by the function F(t$^{(1/2)}$), which is the inverse function of the function F(t$^2$).

Here, each of the ramps of the carrier wave refers to a part of the carrier wave having a time difference between different voltage levels. In other words, the ramp is a main part contributing variation in the pulse width of the signal Vavg2 when the voltage of the signal Vin varies. To put it concretely, if the carrier wave is a sawtooth wave, in which a rise and a sharp drop (or a drop and a sharp rise) in voltage are repeated with time, the ramps of the carrier wave refer to parts obtained by removing the sharp drops (or the sharp rises) in voltage. If the carrier wave is a triangle wave, in which a rise and a drop in voltage are alternately repeated, the ramps of the carrier wave refer to rises and drops in voltage. The sharp rises and the sharp drops in voltage in the sawtooth wave are not referred to as the ramps here because a time difference between different voltage levels is sufficiently small in the sharp rises and the sharp drops.

The voltage of the feedback signal Fb is a product of the voltage of the signal Vfb and a value obtained by dividing the square of the voltage of the signal Vin by the average of the voltage of the signal Vin, that is, {Vfb×(Vin$^2$/Vin average)}.

Figure 5:
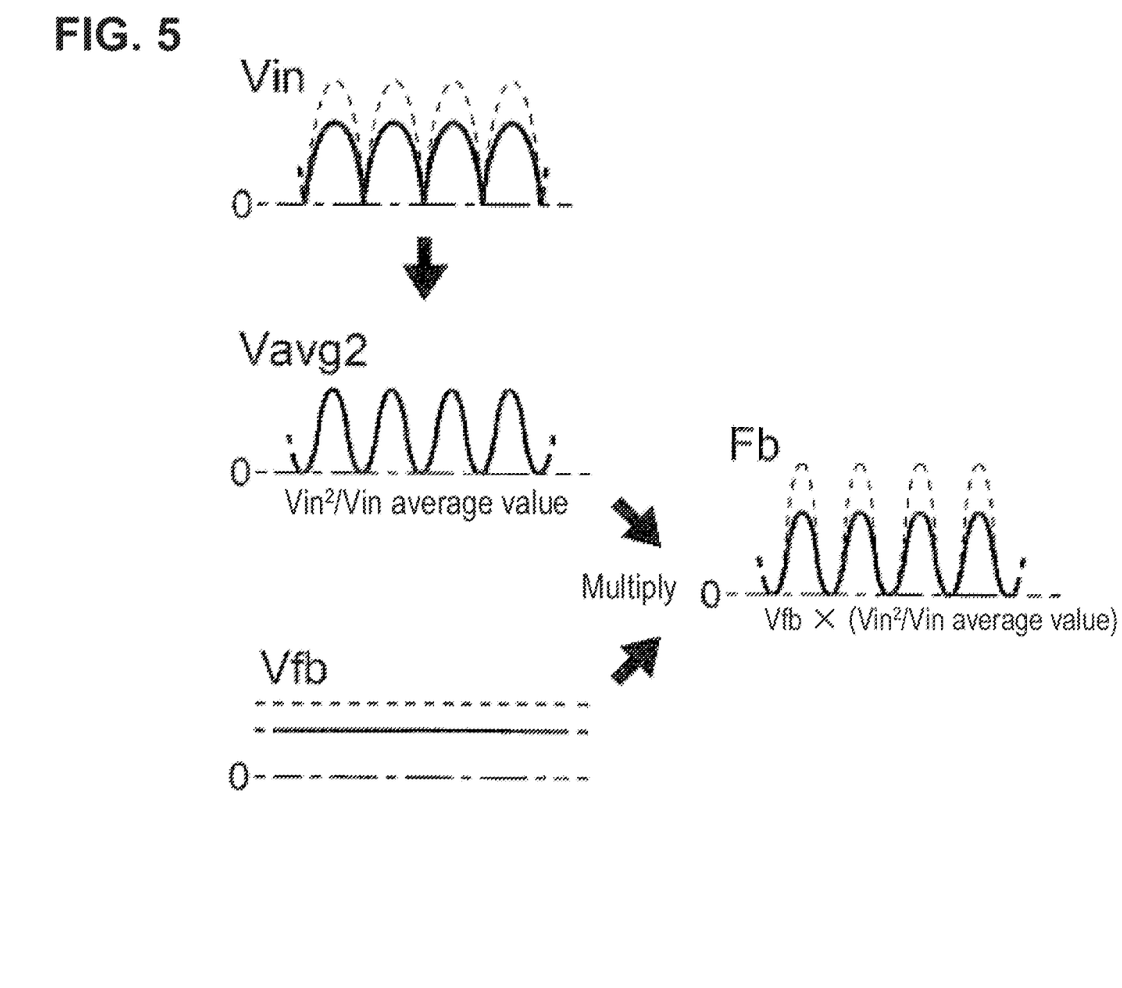
FIG. 5 is a diagram for explaining operation of the switching power supply.

In the embodiment, the term (Vin$^2$) in the product is obtained by forming the waveform of the part T1 of the carrier wave Sc in a shape expressed by the function F(t$^{(1/2)}$). The term (1/Vin average) is obtained by varying the wave height of the carrier wave Sc based on the Vin average. Therefore, if the signal Vavg2 output from the comparator 445a is demodulated by the low-pass filter, the voltage of the Vavg2 is (Vin$^2$/Vin average) as illustrated in FIG. 5.

An instantaneous value of (Vin$^2$/Vin average) is variable based on an instantaneous value of the signal Vin. A wave height and the shape of (Vin$^2$/Vin average) vary little from period to period. To put it concretely, the wave height of (Vin$^2$/Vin average) is about the same whether the signal level (average voltage) of the signal Vin is high or low and the waveform of (Vin$^2$/Vin average) has a large value around a peak of the signal Vin in each period.

Next, the multiplication of the term Vfb in the above product is achieved by conforming the wave height of the signal Vavg2 to a voltage of the signal Vfb by the buffer 445b.

By demodulating, with the low-pass filter 447, the signal Vpwm obtained by conforming the wave height of the signal Vavg2 to the signal Vfb, the feedback signal Fb having the voltage expressed by the product is fed back to the SW circuit 20. The feedback signal Fb has large values around positive and negative peaks of the AC Vac in each period and the duty ratio of the voltage Vsw increases accordingly. A larger amount of energy is supplied to the primary side of the transformer 33 around each of the peaks and this supply of the larger amount of energy improves the power factor of the power supply 1.

To perform multiplication and division by analog computation in prior art, a logarithmic characteristic between a base-emitter voltage Vbe and a collector current Ic of a transistor is often used. To put it concretely, with logarithmic transformation (log transformation), multiplication may be performed by addition and division may be performed by subtraction. By the following procedure, multiplication/ division is performed.

Input signal→Logarithmic transformation→Addition/ subtraction→Inverse logarithmic transformation→Output signal However, since an absolute value of the voltage Vbe of the transistor is small and the collector current Ic varies significantly due to a slight variation, thermal noise and noise of the transistor itself make it difficult to secure a dynamic range. Moreover, since the voltage Vbe easily varies depending on temperature, it is necessary to take a measure such as increase of the number of circuit elements and employment of a customer-specific IC to cancel the impact of the temperature and such a measure may lead to a higher cost.

In the embodiment, on the other hand, the multiplication including squaring and the division are performed by the pulse width modulation. Therefore, as compared with the above-described configuration using the logarithmic characteristic of the transistor, the embodiment has fewer elements variable depending on temperature and a simpler circuit configuration.

Figure 6:
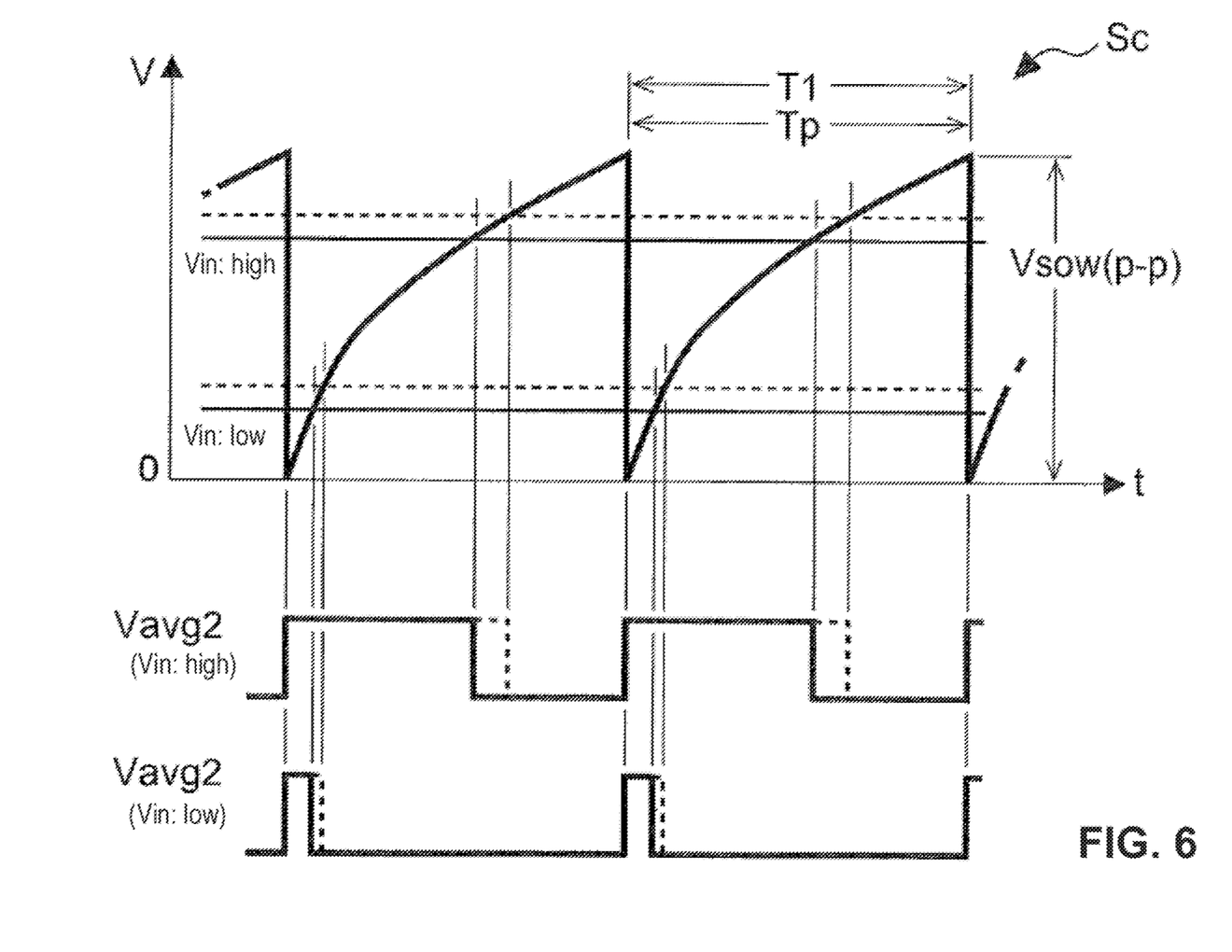
FIG. 6 is a diagram illustrating another exemplary waveform of the carrier wave.

While the carrier wave Sc is the triangle wave illustrated in FIG. 3 in the above-described embodiment, the carrier wave Sc may have a waveform of a sawtooth wave illustrated in FIG. 6. In other words, the parts T2 where the voltage drops in ramp shapes in FIG. 3 may be eliminated to leave only the parts T1 where the voltage rises non-linearly. To put it another way, the non-linear parts T1 may have shapes based on the function $F(t^{(1/2)})$ throughout the domain $0 \leq t \leq 1$.

The parts where the voltage rises non-linearly only need to have slopes decreasing with time. As illustrated in FIG. 6, for example, the higher the voltage of the signal Vin, the more greatly the pulse width of the signal Vavg2 needs to vary based on the variation in the voltage of the signal Vin.

While the parts T1 of the carrier wave Sc where the voltage rises with time are non-linear in FIG. 3 and FIG. 6, the parts T2 of the triangle wave or sawtooth wave where the voltage drops with time may be non-linear. As the control circuit 21, it is possible to use a circuit performing control such that the higher the voltage of the feedback signal Fb, the smaller the duty ratio of the voltage Vsw applied on the primary side of the transformer 33 becomes. In this case, it is necessary only that the term Vfb has positive polarity (a value proportional to the output voltage) and the term (Vin²/Vin average) has negative polarity (a value obtained by subtracting (Vin²/Vin average) from a predetermined value).

APPENDIX

The following aspects are derived from the embodiment described above.

A switching power supply according to an aspect (first aspect) of the present disclosure includes: a rectifying circuit configured to rectify an AC voltage that has been input and configured to output the rectified voltage as a first voltage; a switching circuit configured to switch the first voltage based on a feedback signal into a switching voltage; an output circuit configured to generate a second voltage based on the switching voltage; and a feedback circuit configured to generate the feedback signal based on the first voltage and the second voltage. The feedback circuit includes: a carrier wave generation circuit configured to generate a carrier wave having a predetermined period and a wave height variable based on an average of the first voltage, the carrier wave having a non-linear shape at least at one of a rising edge and a falling edge of the carrier wave; a PWM circuit configured to generate a PWM signal based on a comparison between the first voltage and a voltage of the carrier wave, the PWM signal having a wave height corresponding to the second voltage; and a low-pass filter configured to generate the feedback signal based on the PWM signal. Due to the non-linear shape of the carrier wave, as the first voltage is higher, a pulse width of the PWM signal is changeable more greatly based on a change in the first voltage.

According to this aspect, computation for generating the feedback signal is performed by the pulse width modulation. Therefore, as compared with a configuration using a logarithmic characteristic of a transistor, the configuration according to the aspect has fewer elements variable depending on temperature and a simpler circuit configuration.

The first voltage is the voltage of the signal Vin and the second voltage is the voltage Dc_out(+) or Dc_out(−), for example. The PWM signal is the signal Vpwm, for example. The rising edge of the carrier wave is the part T1 and the falling edge of the carrier wave is the part T2, for example.

In an example (second aspect) of the first aspect, the non-linear shape is based on a function $F(t^{(1/2)})$ in a domain of $0 \leq t \leq 1$. According to this aspect, squaring in generating the feedback signal is performed.

In an example (third aspect) of the first or second aspect, the output circuit includes a transformer into which the switching voltage is input and which is configured to output an AC voltage and a rectifying-smoothening circuit configured to rectify and smoothen the AC voltage into the second voltage.

In an example (fourth aspect) of any one of the first to third aspects, the carrier wave is a sawtooth wave or a triangle wave, the sawtooth wave having a non-linear shape at a rising edge or a falling edge of the sawtooth wave, the triangle wave having a non-linear shape at least at one of a rising edge and a falling edge of the triangle wave.

While an embodiment of the present disclosure and a modification of the embodiment have been described, the embodiment and the modification are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiment and the modification. Thus, these embodiments and modifications thereof are intended to be encompassed by the scope of the present disclosure. The scope of the present invention accordingly is to be defined as set forth in the appended claims.

What is claimed is:

1. A switching power supply comprising:
   a rectifying circuit configured to rectify an AC voltage that has been input and configured to output the rectified voltage as a first voltage;
   a switching circuit configured to switch the first voltage based on a feedback signal into a switching voltage;

an output circuit configured to generate a second voltage based on the switching voltage; and
a feedback circuit configured to generate the feedback signal based on the first voltage and the second voltage, the feedback circuit comprising:
  a carrier wave generation circuit configured to generate a carrier wave having a predetermined period and a wave height variable based on an average of the first voltage, the carrier wave having a non-linear shape at least at one of a rising edge and a falling edge of the carrier wave;
  a PWM circuit configured to generate a PWM signal based on a comparison between the first voltage and a voltage of the carrier wave, the PWM signal having a wave height corresponding to the second voltage, wherein due to the non-linear shape of the carrier wave, as the first voltage is higher, a pulse width of the PWM signal is changeable more greatly based on a change in the first voltage; and
  a low-pass filter configured to generate the feedback signal based on the PWM signal.

2. The switching power supply according to claim 1, wherein the non-linear shape is based on a function $F(t^{(1/2)})$ in a domain of $0 \le t \le 1$.

3. The switching power supply according to claim 2, wherein the output circuit comprises
  a transformer into which the switching voltage is input and which is configured to output an AC voltage, and
  a rectifying-smoothening circuit configured to rectify and smoothen the AC voltage into the second voltage.

4. The switching power supply according to claim 3, wherein the feedback circuit comprises
  a feedback signal generation circuit into which the first voltage is input from the rectifying circuit, and
  a separator into which the second voltage is input from the output circuit, and
  wherein the feedback signal generation circuit is configured to output the feedback signal to the switching circuit based on the input first voltage and an output from the separator.

5. The switching power supply according to claim 2, wherein the carrier wave is a sawtooth wave or a triangle wave, the sawtooth wave having a non-linear shape at a rising edge or a falling edge of the sawtooth wave, the triangle wave having a non-linear shape at least at one of a rising edge and a falling edge of the triangle wave.

6. The switching power supply according to claim 2, wherein the feedback circuit comprises
  a feedback signal generation circuit into which the first voltage is input from the rectifying circuit, and
  a separator into which the second voltage is input from the output circuit, and
  wherein the feedback signal generation circuit is configured to output the feedback signal to the switching circuit based on the input first voltage and an output from the separator.

7. The switching power supply according to claim 2, wherein the wave height of the carrier wave output from the carrier wave generation circuit is proportional to the average of the input first voltage.

8. The switching power supply according to claim 2, wherein the output circuit is configured to output, based on the input switching voltage, a positive-side voltage and a negative-side voltage of the second voltage, and wherein a voltage difference between the positive-side voltage and the negative-side voltage of the second voltage is input to the PWM circuit of the feedback circuit.

9. The switching power supply according to claim 8, wherein the signal output from the PWM circuit has a product voltage corresponding to a product of the voltage difference and a quotient voltage, wherein the quotient voltage corresponds to a quotient of a square of the first voltage by the average of the first voltage.

10. The switching power supply according to claim 1, wherein the output circuit comprises
  a transformer into which the switching voltage is input and which is configured to output an AC voltage, and
  a rectifying-smoothening circuit configured to rectify and smoothen the AC voltage into the second voltage.

11. The switching power supply according to claim 10, wherein the carrier wave is a sawtooth wave or a triangle wave, the sawtooth wave having a non-linear shape at a rising edge or a falling edge of the sawtooth wave, the triangle wave having a non-linear shape at least at one of a rising edge and a falling edge of the triangle wave.

12. The switching power supply according to claim 10, wherein the feedback circuit comprises
  a feedback signal generation circuit into which the first voltage is input from the rectifying circuit, and
  a separator into which the second voltage is input from the output circuit, and
  wherein the feedback signal generation circuit is configured to output the feedback signal to the switching circuit based on the input first voltage and an output from the separator.

13. The switching power supply according to claim 10, wherein the wave height of the carrier wave output from the carrier wave generation circuit is proportional to the average of the input first voltage.

14. The switching power supply according to claim 1, wherein the carrier wave is a sawtooth wave or a triangle wave, the sawtooth wave having a non-linear shape at a rising edge or a falling edge of the sawtooth wave, the triangle wave having a non-linear shape at least at one of a rising edge and a falling edge of the triangle wave.

15. The switching power supply according to claim 1, wherein the feedback circuit comprises
  a feedback signal generation circuit into which the first voltage is input from the rectifying circuit, and
  a separator into which the second voltage is input from the output circuit, and
  wherein the feedback signal generation circuit is configured to output the feedback signal to the switching circuit based on the input first voltage and an output from the separator.

16. The switching power supply according to claim 1, wherein the feedback circuit further comprises an averaging circuit configured to output, based on the input first voltage, the average of the first voltage to the carrier wave generation circuit.

17. The switching power supply according to claim 1, wherein the wave height of the carrier wave output from the carrier wave generation circuit is proportional to the average of the input first voltage.

18. The switching power supply according to claim 1, wherein the output circuit is configured to output, based on the input switching voltage, a positive-side voltage and a negative-side voltage of the second voltage, and wherein a voltage difference between the positive-side voltage and the negative-side voltage of the second voltage is input to the PWM circuit of the feedback circuit.

19. The switching power supply according to claim 18, wherein the PWM circuit is configured to change the wave height of the PWM signal based on the input voltage difference.

20. The switching power supply according to claim 18, wherein the signal output from the PWM circuit has a product voltage corresponding to a product of the voltage difference and a quotient voltage, wherein the quotient voltage corresponds to a quotient of a square of the first voltage by the average of the first voltage.

* * * * *